United States Patent [19]

Boom

[11] 3,737,042

[45] June 5, 1973

[54] PRODUCTION OF IMPROVED SEMIPERMEABLE POLYBENZIMIDAZOLE MEMBRANES

[75] Inventor: Abraham A. Boom, Martinsville, N.J.

[73] Assignee: Celanese Corporation, New York, N.Y.

[22] Filed: Jan. 20, 1972

[21] Appl. No.: 219,576

Related U.S. Application Data

[63] Continuation-in-part of Ser. No. 30,846, April 22, 1970, Pat. No. 3,699,038.

[52] U.S. Cl. .................210/321, 210/23, 210/500, 264/216
[51] Int. Cl. ..........................B01d 13/00
[58] Field of Search................210/22, 23, 321, 210/500; 204/41, 49, 216

[56] References Cited

UNITED STATES PATENTS 3,699,038  10/1972  Boom..................210/23

*Primary Examiner*—Samih N. Zaharna
*Assistant Examiner*—Richard Barnes
*Attorney*—Thomas J. Morgan et al.

[57] ABSTRACT

A member cast in the form of either a hollow filament or a flat film formed of a polybenzimidazole polymer and possessing reverse osmosis properties is subject to an annealing process by contacting the membrane with an organic liquid under conditions found capable of substantially enhancing the properties of the same. These polybenzimidazole membranes find particular utility in reverse osmosis desalination procedures. The annealing step of the present process substantially improves the performance of the membranes in such a separation.

32 Claims, No Drawings

PRODUCTION OF IMPROVED SEMIPERMEABLE POLYBENZIMIDAZOLE MEMBRANES

CROSS-REFERENCE TO RELATED APPLICATION

This application is a continuation in part of copending U.S. Patent application, Ser. No. 30,846, filed on Apr. 22, 1970 and now U.S. Pat. No. 3,699,038.

BACKGROUND OF THE INVENTION

In recent years there has been increasing interest expressed in the development of microporous membranes of a semipermeable nature which are useful in separating the components of a solution. For instance, semipermeable membranes have been looked to as a possible means to demineralize or purify otherwise unusable water and to thereby alleviate the increasing demands for potable water necessitated by the rapid growth of the population and industry in many parts of the world. Separation techniques which employ such membranes include electrodialysis, ultrafiltration, etc.

Electrodialysis separations employ an electrolytic cell having alternating anionic and cationic membranes that collect desalted and concentrated solutions in adjacent compartments. Such a technique can be useful to purify liquids by removing ionizable impurities, to concentrate solutions of electrolytes, or to separate electrolytes from non-electrolytes.

As opposed to the charge dependent types of separations, reverse osmosis utilizes pressure to move materials which may be either ionic or non-ionic selectively through a membrane. Ultrafiltration, which is very similar, uses gravity or applied pressure to effect separation using membranes which act as submicronic sieves to retain large molecules and permit the passage of small, ionic, or non-ionic forms.

The desalination of saline water (e.g., sea water) through the use of semipermeable membranes is commonly characterized by the use of pressure in excess of osmotic pressure and is therefore termed reverse osmosis. The natural tendency for a solution of a higher concentration separated from a solution of lower concentration by a semipermeable membrane, is for the solvent on the side of lower concentration to migrate through the membrane to the solution of higher concentration thereby eventually equilibrating the concentrations of the two solutions. The degree of this natural tendency is measured in terms of osmotic pressure. The process may be reversed by applying a pressure to the side of higher concentration in excess of the osmotic pressure, thereby forcing the pure solvent of the solution of higher concentration through the semipermeable membrane to the side of lower concentration, thereby bringing about a separation. The natural tendency which is believed to be the result of a difference in free energy resulting from the concentration gradient, is observed to operate at a high thermodynamic efficiency, and at ambient temperature.

Semipermeable membranes proposed in the past have been formed from a variety of materials, and are characterized by the ability to allow one component (e.g., ions or molecules) of a solution to pass through the same to the substantial exclusion of other components (e.g., other ions or molecules). Examples of substances heretofore recognized to possess this property include cellophane (i.e., regenerated cellulose), cellulose esters (e.g., cellulose acetate, cellulose butyrate, etc.), animal or protein membranes, polyelectrolyte complexes, ethyl cellulose, cross-linked polyacrylates, etc.

The semipermeable membranes of the prior art are of limited applicability in many separatory processes because of inherent disadvantages relating to their chemical stability, strength, thermal stability, efficiency, length of life, and cost. Generally, the prior art membranes exhibit low thermal stability and therefore cannot be used successfully under conditions wherein the liquid undergoing treatment is at an elevated temperature. This may be a decided disadvantage in situations where the components to be separated only exist in solution at higher temperatures, or when it is economically advantageous to separate components of a solution at elevated temperatures rather than going through the expense of cooling it. Furthermore, some membranes exhibit a decided decrease in efficiency with increase in temperature or pressure thereby limiting their range of applicability. Solvent susceptibility may be another factor affecting the applicability of a particular porous membrane to a separation process. Additionally, semipermeable membranes may be inappropriate for a particular application due to low solute rejection values or low flux.

Other factors which render the semipermeable membranes of the prior art of limited usefulness in reverse osmosis separatory processes include their limited strength and chemical resistance and extremely short operating lives at high pressures and temperatures. Low strength properties have generally been manifest in the form of the inability of the prior art films to operate at pressures in excess of about 1,000 psi or to operate at lower pressures for extended periods of time, especially at temperatures in excess of about 50° C. The use of such high pressures is quite desirable in order to increase the speed of reverse osmosis, particularly the speed at which desalinized water is formed. However, when such high pressures have been employed operating efficiency, (i.e., in reverse osmosis desalinization, the degree of salt removal from saline solutions) has significantly decreased. With the use of pulsating pumps in reverse osmosis separatory operations the presence of rapid increases and decreases in the pressure applied to the reverse osmosis membrane has caused even greater problems when the use of prior art membranes has been attempted. Furthermore, in general commercial usages it is necessary that membranes be strong enough to withstand shipment, storage and general rough handling. Thus, the continued need to replace the prior art membranes due to mechanical failures has greatly limited their commercial usefulness.

The chemical resistance properties of the prior art separatory membranes have been their greatest shortcoming. Although the separation of solutions comprising only sodium chloride and water presents few chemical resistance problems to the prior art membranes, such pure solutions are rarely found. Many naturally occurring saline solutions contain materials which exhibit a degrading effect on previously known reverse osmosis membranes. For example, cellulose acetate and amide-linked polymers, such as those disclosed in U.S. Pat. No. 3,597,632, are subject to either base or acid catalyzed hydrolysis even in weakly basic or acidic solutions. Other compounds which may exhibit a degrading effect on the prior art membranes include formic acid, acetone and bisulfite ions.

Finally, many of the prior art semipermeable membranes are limited in their usefulness because of the low temperatures at which separatory operations must occur. Higher temperatures — those in excess of about 50° C. — have resulted in reduced salt removal efficiency, particularly when extended operating times have been employed.

Representative cellulose acetate membranes, which may be utilized in desalination process are disclosed in Loeb et al., U.S. Pat. No. 3,133,132, issued May 12, 1964. The Loeb et al. patent also discloses a process for preparing semipermeable membranes involving the casting of a cellulose acetate solution containing a pore producing agent, (i.e., an agent which produces a structure which allows an appreciable rate of passage of fresh water under suitable conditions). It has been found, however, that cellulose acetate membranes described therein must be utilized under relatively mild conditions and may not satisfactorily be utilized at elevated temperatures, (i.e., in excess of 70° to 80° C.) Upon continuous exposure to salt water such cellulose acetate membranes tend to undergo hydrolysis and become less effective for their intended purpose. Also, such membranes may be damaged by contact with a variety of solvents (e.g., phenol, acetone, methyl ethyl ketone, sodium hydroxide solutions, mineral acid solutions), or by bacteriological attack. Amide-containing membranes which may be utilized in desalination processes are disclosed in Richter, et al., U.S. Pat. No. 3,567,632, issued Mar. 2, 1971. This patent discloses reverse osmosis desalination membranes prepared from nitrogen-linked aromatic polymers. These membranes, however, still exhibit many of the disadvantages previously noted for prior art semipermeable membranes and are therefore of limited usefulness. Although the Richter et al. amide-linked polymer membranes may be operated at somewhat higher temperatures and possess greater strength than, for example, cellulose acetate membranes, the relative increases are still less than are commercially desirable. Generally the useful life of such membranes at pressures in excess of about 300 to 400 p.s.i. is limited to about one to three months. After this period of operation both salt rejection percentage (in aqueous saline solutions) and desalinized water preparation speed has significantly decreased. Finally, these membranes are of limited chemical resistance, especially in view of their susceptability to aqueous hydrolysis in the presence of bases or acids.

More specifically, the membranes described herein are characterized by the fact that they allow one or more components of a solution to pass through them while they prevent the passage of one or more other components.

It is an object of the invention to provide processes for the production of semipermeable polybenzimidazole membranes.

It is an object of the invention to provide semipermeable polybenzimidazole membranes which may be utilized to separate components of a solution.

The applicability of a particular membrane to the separation of components from solutions appears to depend on both the physical nature of the semipermeable structure and the particular chemical structure of the membrane. It should be noted here that, in accordance with common usage, the terms microporous and semipermeable or permeable will be used interchangeably to denote the character or quality of the membrane which is necessary to render the membrane suitable for the use herein intended. More specifically, the membranes described herein are characterized by the fact that they allow one or more components of a solution to pass through them while they prevent the passage of one or more other components. Furthermore, the term membrane will be used to describe membranes whether prepared as a flat film, hollow fiber, or other form.

Commonly assigned U.S. Ser. No. 28,940 of Willard C. Brinegar, and U.S. Ser. No. 219,137, a continuation in part of U.S. Ser. No. 28,940, filed concurrently herewith, disclose a process for the production of semipermeable polybenzimidazole membranes. The present invention represents an improvement over the processes of Willard C. Brinegar.

It is an object of the invention to provide a process for the production of improved semipermeable polybenzimidazole membranes.

It is an object of the invention to provide a process for the production of polybenzimidazole membranes which exhibit improved performance properties.

It is an object of the invention to provide improved semipermeable polybenzimidazole membranes which may be utilized to separate components of a solution.

It is an object of the invention to provide improved semipermeable membranes possessing enhanced chemical and thermal stability.

It is another object of the invention to provide improved semipermeable membranes of enhanced solvent resistance.

It is a further object of the invention to provide an improved process for separating the components of an aqueous salt solution utilizing the resulting semipermeable polybenzimidazole membranes.

These and other objects as well as the scope, nature and utilization of this invention will be apparent from the following detailed description.

SUMMARY OF THE INVENTION

Surprisingly, it has now been found that by utilizing the polybenzimidazole semipermeable membranes described herein it is possible to prepare reverse osmosis membranes which have increased strength properties, improved chemical resistance, longer operating lives at increased pressures and temperatures, and which are operable utilizing either side of the membrane. While the prior art has taught that it is desirable to use polymeric membranes which have low moisture absorption, when strength and chemical resistance properties are sought, the polymers of this invention exhibit extremely high moisture regain in addition to improved chemical and strength properties.

Whether flat film or hollow fiber membranes are utilized in the instant invention, the basic process is still the same. It generally involves contacting one side of the particular polybenzimidazole membrane with the liquid upon which the reverse osmosis operation is to be applied, and recovering from the other side of said membrane a liquid which passes through the membrane and which contains a reduced amount of one component of the initial liquid mixture or solution.

The reverse osmosis membranes of the instant invention exhibit unique and unexpected properties which distinguish them over the prior art reverse osmosis membranes. Utilizing the membranes of the instant invention either in the form of a flat film or in the form of a hollow filament, it is possible to carry out reverse osmosis operations such as the desalination of salt water at much higher operating temperatures than were previously possible using the reverse osmosis membranes described in the prior art. For example, it is possible to carry out reverse osmosis utilizing the membranes of the instant invention at temperatures as high as 75° to 80° C. Furthermore, the membranes of the instant invention exhibit significantly increased strength properties when compared to the membranes of the prior art. This increase in strength allows the utilization of the instant membranes for longer periods of time at increased pressures and temperatures and thus enables more efficient, speedier reverse osmosis operations. Moreover, utilizing the instant membranes commercially feasable reverse osmosis units may be prepared which can be transported, stored, installed and operated without the concern previously noted for the durability of the membrane itself.

The membranes of the instant invention, contrary to some membranes proposed and utilized in the prior art, can be operated using either side of the membrane. Thus, for example, it would be possible to use a membrane for a time in one direction and then switch the direction of flow in the membrane, thereby cleaning the previously used side of the membrane. The membrane could then be operated in this direction until it was desirable again to switch operating sides. Finally, and most important of all, the reverse osmosis membranes of the instant invention, whether used in the form of a flat film or a hollow fiber, exhibit significant increases in chemical resistance properties over all prior art osmosis membranes. While the amide-linked reverse osmosis membranes of the prior art — those generally contended to be the most chemically resistant — are subject to base and acid catalyzed aqueous hydrolysis, bisulfite attack and solvation by formic acid, and are therefore limited in their useful life when thusly employed, there is no such limiting factor with the reverse osmosis membranes of the instant invention. In fact, the reverse osmosis membranes of the instant invention are practically inert chemically and therefore can be used in varied osmosis separation systems without chemical attack or solvation.

It has further been found that by carrying a process for producing a semipermeable membrane which comprises the following steps results in the preparation of membranes having still greater improvements in flow rate and rejection percentages:

a. providing a solution of a polybenzimidazole polymer in a solvent capable of dissolving said polymer, b. depositing a film of said solution upon a support, c. evaporating an amount of solvent from said film sufficient to allow the formation of a thin solid layer on the exposed surface of said film having a density which is substantially greater than the remaining portion of said film on which said solid layer of increased density is formed, d. washing the resulting film with a non-solvent for said polymer to remove residual solvent thereby producing a semipermeable membrane, and e. annealing said resulting semipermeable membrane by contact with an organic liquid at a temperature of about 135° to 300° C. which is a nonsolvent for said polymer.

Likewise hollow fil membranes comprising a hollow filament spun from a polybenzimidazole polymer can be annealed and utilized with equivalent results. Such filaments can be prepared by a process which comprises a. extruding the filament through a concentric hollow jet spinnerette, b. coagulating the thus formed hollow filament in a coagulation bath, and c. annealing the resulting semipermeable hollow fil membrane by contact with an organic liquid at a temperature of about 135° to 300° C. which is a nonsolvent for said polymer.

DESCRIPTION OF PREFERRED EMBODIMENTS

The Starting Polymer

The polymeric material utilized to form the semipermeable membranes of the present invention is a linear polybenzimidazole. Typical polymers of this class and their preparation are more fully described in U.S. Pat. No. 2,895,948, U.S. Pat. No. RE 26,065, and in the Journal of Polymer Science, Vol. 50, pages 511–539 (1961) which are herein incorporated by reference. The polybenzimidazoles consist essentially of recurring units of the following Formulas I and II.

Formula I is:

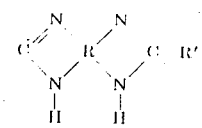

wherein R is a tetravalent aromatic nucleus, preferably symmetrically substituted, with the nitrogen atoms forming the benzimidazole rings being paired upon adjacent carbon atoms, i.e., ortho carbon atoms, of the aromatic nucleus, and R' is a member of the class consisting of (1) an aromatic ring, (2) an alkylene group (preferably those having four to eight carbon atoms), and (3) a heterocyclic ring from the class consisting of (a) pyridine, (b) pyrazine, (c) furan, (d) quinoline, (e) thiophene, and (f) pyran.

Formula II is:

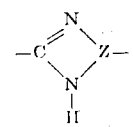

wherein Z is an aromatic nucleus having the nitrogen atoms forming the benzimidazole ring paired upon adjacent carbon atoms of the aromatic nucleus.

Preferably, aromatic polybenzimidazoles are selected, e.g., from polymers consisting essentially of the recurring units of Formulas I and II wherein R' is an aromatic ring or a heterocyclic ring.

As set forth in U.S. Pat. No. RE 26,065, the aromatic polybenzimidazoles having the recurring units of Formula II may be prepared by self-condensing a trifunctional aromatic compound containing only a single set of ortho disposed diamino substituents and an aromatic, preferably phenyl, carboxylate ester substituent. Exemplary of polymers of this type is poly-2,5(6)- benzimidazole prepared by the autocondensation of phenyl-3,4-diaminobenzoate.

As also set forth in the above-mentioned patent, the aromatic polybenzimidazoles having the recurring units of Formula I may be prepared by condensing an aromatic tetraamine compound containing a pair of orthodiamino substituents on the aromatic nucleus with a dicarboxyl compound selected from the class consisting of (a) the diphenyl ester of an aromatic dicarboxylic acid, (b) the diphenyl ester of a heterocyclic dicarboxylic acid wherein the carboxyl groups are substituents upon carbon in a ring compound selected from the class consisting of pyridine, pyrazine, furan, quinoline, thiophene and pyran and (c) an anhydride of an aromatic dicarboxylic acid.

Examples of polybenzimidazoles which have the recurring structure of Formula I are as follows:

poly-2,2'(m-phenylene)5,5'-bibenzimidazole;
poly-2,2'-(pyridylene-3'',5'')-5,5' bibenzimidazole;
poly-2,2'-(furylene-2'',5'')-5,5'-bibenzimidazole;
poly-2,2'-(naphthalene-1'',6'')-5,5'-bibenzimidazole;
poly-2,2'-amylene-5,5'-bibenzimidazole;
poly-2,2'-octamethylene-5,5'-bibenzimidazole;
poly-2,6-(m-phenylene)-dimidazobenzene;
poly-2,2'-cyclohexeneyl-5,5'-bibenzimidazole;
poly-2,2'(m-phenylene)-5,5'-di(benzimidazole) ether;
poly-2,2'(m-phenylene)-5,5'-di(benzimidazole) sulfide;
poly-2,2'(m-phenylene)-5,5'-di(benzimidazole) sulfone;
poly-2,2'(m-phenylene)-5,5'-di(benzimidazole) methane;
poly-2',2''(m-phenylene)-5',5''di(benzimidazole) propane-2,2; and
poly-2',2''(m-phenylene)-5',5'' di(benzimidazole) ethylene-1,2 where the double bonds of the ethylene groups are intact in the final polymer.

The preferred polybenzimidazole for use in the present process is one prepared from poly-2,2'-(m-phenylene)-5,5'-bibenzimidazole, the recurring unit of which is:

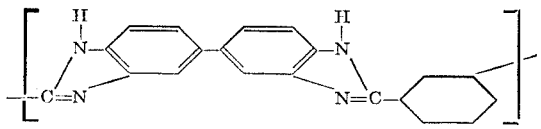

Any polymerization process known to those skilled in the art may be employed to prepare the polybenzimidazole which is utilized to form semipermeable membranes in accordance with the present invention. With respect to aromatic polybenzimidazoles, preferably, equimolar quantities of the monomeric tetraamine and dicarboxyl compound may be introduced into a first step melt polymerization reaction zone and heated therein at a temperature above about 200° C., preferably at least 250° C., and more preferably from about 270° to 300° C. The reaction is conducted in a substantially oxygen-free atmosphere, i.e., below about 20 ppm oxygen and preferably below about 8 ppm oxygen, until a foamed prepolymer is formed. Usually, the first stage reaction is continues until a prepolymer is formed having an inherent viscosity, expressed as deciliters per gram, of at least 0.1, and preferably from about 0.13 to 0.3 (determined from a solution of 0.4 grams of the polymer in 100 ml. of 97 percent H$_2$SO$_4$ at 25° C.).

After the conclusion of the first stage reaction, which normally takes at least 0.5 hours and preferably 1 to 3 hours, the foamed prepolymer is cooled and then powdered or pulverized in any convenient manner. The resulting prepolymer powder is then introduced into a second stage polymerization reaction zone wherein it is heated under substantially oxygen-free conditions, as described above, to yield a polybenzimidazole polymer product, desirably having an I.V., as measured above, of at least 0.4, (e.g., 0.8 to 1.1 or more.) When the polybenzimidazole polymer is to be utilized in the form of a hollow fiber its preferred inherent viscosity is at least about 0.5 most preferably in the range of about 0.7 to about 1.4.

The temperature employed in the second stage is at least 250° C., preferably at least 325° C., and more preferably from about 350° to 425° C. The second stage reaction generally takes at least 0.5 hours, and preferably from about 1 to 4 hours or more. It is of course also possible to prepare the instant polymers via a one-step reaction, however, the previously described two-step process is preferred.

The Polymer Solution

The solvents utilized to form the polybenzimidazole polymer solutions include those solvents which are commonly recognized as being capable of dissolving the particular polybenzimidazole polymer. For instance, the solvents may be selected from those commonly utilized in the formation of polybenzimidazole dry spinning solutions. Illustrative examples of suitable solvents include N,N-dimethyl acetamide, N,N-dimethyl formamide, dimethyl sulfoxide, and N-methyl-2-pyrrolidone. The particularly preferred solvent is N,N-dimethyl acetamide. Additional representative solvents include formic acid, acetic acid, and sulfuric acid.

The polymer solutions may be prepared, for example, by dissolving sufficient polybenzimidazole in the solvent to yield a final solution containing from about 5 to 30 percent by weight of polymer based on the total weight of the solution, and preferably from about 10 to 20 percent by weight.

The quantity of polybenzimidazole dissolved in the solvent should be such that the resulting solution has a viscosity of about 50 to 4,000 poises at 30° C., and preferably about 400 to 600 poises.

One suitable means for dissolving the polymer in the solvent is by mixing the materials at a temperature above the normal boiling point of the solvent, for example, about 25° to 120° C. above such boiling point, and at a pressure of 2 to 15 atmospheres for a period of 1 to 5 hours. The resulting solutions then preferably are filtered to remove any undissolved polymer. A minor amount of lithium chloride optionally may be provided in the spinning solution in accordance with the teachings of commonly assigned U.S. Ser. No. 521,501, filed Jan. 16, 1966, of Anthony B. Conciatori and Charles L. Smart. The lithium chloride serves the function of preventing the polybenzimidazole polymer from phasing out of the solution upon standing for extended periods of time.

Semipermeable Flat Film Membrane Formation

The solution of polybenzimidazole polymer is deposited upon a support to form a wet film of the same. The nature of the support is not critical and may be selected from a variety of materials including ceramic, glass, or metallic plates (e.g., stainless steel). The support is preferably provided with retaining sides, or raised edges, whereby the solution is confined to the surface thereof at the desired location until its consistency is such that retaining sides are no longer needed. Numerous techniques are available for the application of the solution to the support as will be apparent to those skilled in the art. For instance, the polybenzimidazole polymer solution may be simply poured upon a level support in a quantity sufficient for it to assume the desired uniform thickness. A blade optionally may be drawn over the surface of the wet film to aid the deposition of a wet film of uniform thickness. In a preferred embodiment of the invention, the solution is deposited by the utilization of a doctor blade caster.

The thickness of the wet film deposited upon the support is influenced by the desired thickness of the polybenzimidazole semipermeable membrane ultimately to be produced. Commonly the wet film is deposited upon the support in a substantially uniform thickness of about 1 to 30 mils and preferably 2 to 10 mils. In a particularly preferred embodiment of the invention, the wet film is deposited in a thickness of about 4 to 8 mils.

A quantity of solvent is next evaporated from the exposed surface of the wet film to allow the formation of a relatively thin solid layer (i.e., a thin porous polymeric film) on the exposed surface of the same. The thin solid film commonly exhibits a thickness of about 0.01 to 20 microns, and preferably about 1 to 10 microns. During the formation of the solid layer on the exposed surface of the film, the solvent present near the surface of the wet film is flashed off and a thin coagulated solid layer or skin of polybenzimidazole polymer remains. The remaining portion of wet film which supports the solid layer remains essentially unchanged while the solid layer is formed. The solid layer accordingly exhibits a density which is substantially greater than that of the remaining portion of the film which has not undergone coagulation and continues to possess a liquid consistency.

The evaporation of solvent from the exposed surface of the wet film may be accomplished by a variety of techniques as will be apparent to those skilled in the art. For instance, a stream of air or other gas at ambient or at an elevated temperature (e.g., approaching the boiling point of the solvent) may be simply directed at the exposed surface of the wet film. Alternatively, the wet film may be simply allowed to stand in an uncirculated gaseous environment wherein the requisite degree of solvent evaporation is accomplished. In a further embodiment of the invention, the gaseous atmosphere to which the wet film is exposed may be at reduced pressure, e.g., 100 mm of Hg up to near atmospheric pressure. It will be apparent to those skilled in the art that the rate at which the solvent is evaporated increases with the temperature of the gaseous atmosphere impinging upon the wet film, the flow rate of the gaseous atmosphere, and with reduced pressure. The time required to form the desired thin solid layer upon the exposed surface of the wet film commonly ranges from about 5 seconds to 30 minutes, and preferably from about 15 seconds to 5 minutes. In a preferred embodiment of the invention the wet film is exposed to a stream of circulating air at ambient temperature (e.g. 25° C.) and pressure for about 1 to 5 minutes. When the air is not circulated, longer exposure times advantageously may be employed.

The resulting film bearing a thin solid layer upon its surface is next converted to a semipermeable membrane suitable for separating components of a solution by washing the same with a non-solvent for the polybenzimidazole polymer which is capable of removing residual quantities of the polybenzimidazole solvent. During the wash step, the remaining polybenzimidazole polymer within the wet film is coagulated while the solvent which originally dissolved the same is removed. The wash medium is preferably aqueous in nature and is most preferably water. The wash step is preferably carried out by immersing the film in the wash medium. Alternatively, any other convenient means for contacting the film with the wash medium may be utilized, such as by spraying the film with the same. In a preferred embodiment of the invention a water wash medium is provided at a relatively cool temperature, e.g., at about 5° to 30° C., and at a temperature of about 10° to 25° C. in a particularly preferred embodiment. The time required to accomplish coagulation of the remaining polybenzimidazole polymer and the substantial removal of residual solvent for the same varies with the temperature of the wash medium. The removal of residual solvent usually requires at least about 30 seconds in contact with the wash medium. Satisfactory wash times commonly range from about 30 seconds to 20 minutes, and preferably about 2 to 5 minutes. Considerably longer wash times may be employed, but generally with no commensurate advantages.

The resulting flat film membranes formed of polybenzimidazole polymer consist of an outer relatively thin surface layer formed during the evaporation step adjacent to a relatively thick layer of a more porous structure formed during the wash step. It is believed that the denser relatively thin outer layer is primarily responsible for the ability described hereafter of the resulting membranes to effect the separation of the components of a solution, and that the remaining more porous portion of the membrane serves primarily a supporting function. The membranes are characterized by high thermal stability and can withstand temperatures during use in excess of 125° C. Also, the membranes exhibit a high degree of chemical stability, and can continue to function in spite of contact with a wide variety of reagents and solvents.

SEMIPERMEABLE HOLLOW FIL MEMBRANE FORMATION

Membranes formed of either a single, or, for utility's sake, a plurality of parallel polybenzimidazole hollow fibers also find utility in the instant invention. These filaments can be prepared by solution spinning using a dope of the polybenzimidazole polymer. Suitable solvents for the preparation of this dope include those solvents which are commonly recognized as capable of dissolving the particular polybenzimidazole polymer, such as those solvents used in preparing the polymer solution for film preparation as described above. Particularly preferred is a solvent system comprising dimethylacetimide and lithium chloride.

Using conventional equipment and techniques the dope is placed in an extrusion or spinning bomb at the desired solids. The extrusion solids of course are dependent upon the viscosity and molecular weight of the particular polybenzimidazole polymer used. However, using dimethylacetimide and lithium chloride as a solvent system, solids in the range of about 20 to 30 weight percent are typical. In selecting the solids to be used it is desirable to use a dope having the highest possible viscosity which can still be extruded at the desired extrusion temperature. Extrusion temperatures generally range from about room temperature or slightly lower to as high as 100° to 150° C.

The bomb containing the spinning dope is attached to the spinnerette and pressurized with sufficient pressure to cause the polymer solution contained in the bomb to escape through the spinnerette jet. It is of course understood that in order to prepare optimum hollow filaments the dope placed in the bomb should be filtered either prior to placing it in the bomb or just prior to spinning. The spinnerette or nozzle through which the hollow filaments are spun comprises an inner nozzle and a concentric nozzle arranged about the inner nozzle and is referred to as a concentric hollow jet spinnerette. In order to maintain the hollow configuration of spun fibers a fluid, either gaseous or liquid, is forced through the inner nozzle. Examples of this fluid include nitrogen and ethylene glycol.

As the polybenzimidazole polymer is spun it is fed into a coagulation bath, which bath comprises a solvent or solvent system which is a non-solvent for the polybenzimidazole polymer employed and preferably is a solvent for the dope solvent. Though the hollow filament can be spun directly into the coagulation bath, it is preferred to expose the spun fiber to a gas capable of effecting surface coagulation or drying on the fiber. Generally this can be accomplished by spinning the fiber into air for usually not more than 1 to 10 seconds, or in any case no longer than is required to coagulate a thin surface layer on the fiber.

The preferred types of coagulation bath solvents include water, ethylene glycol and mixtures of these two. The speed at which the hollow filament is introduced into the coagulation bath can vary depending upon the length of the bath used. Generally speeds of about 2 to 50 meters per minute, preferably five to 20 meters per minute, are utilized with baths which are from 1 to 10 meters, preferably 1 to 5 meters long. Thus exposure to the bath should be in the range of about two to ten seconds or longer.

During the coagulation bath treatment step, the hollow filament material is preferably subject to a drawing operation. The purpose of this drawing operation is to decrease the size of the hollow filament, thereby increasing its surface area per unit volume, and its strength. Preferably the spun hollow filament material is drawn at a ratio between 1 and 20 to 1, most preferably between 5 and 15 to 1. The resulting filaments exhibit an inside diameter of about 12 microns to about 500 microns and an outside diameter of about 25 microns to about 1000 microns, preferably 25 to 250 microns and 50 to 500 microns respectively.

During any of the above steps the hollow filament when exposed to air should be kept moist so as not to impair the filament's reverse osmosis properties.

The Annealing Treatment

The semipermeable polybenzimidazole membrane, either in its flat film or hollow fil form, is next annealed by contact with an organic liquid which is a non-solvent for the polybenzimidazole at a temperature of about 135° to 300° C. The organic liquid is preferably water-miscible.

A preferred class of organic liquids is the polyhydroxy alcohols having two to three hydroxy groups and two to six carbon atoms. Representative polyhydroxy aliphatic alcohols of use in the present process include glycols such as ethylene glycol (1,2-ethanediol), propylene glycol (1,2-propanediol), trimethylene glycol (1,3-propanediol), alpha-butylene glycol (1,2-butanediol), beta-butylene glycol (1,3-butanediol), tetramethylene glycol (1,4-butanediol), sym-dimethylethylene glycol (2,3-butanediol), diethylene glycol (2,2'-oxydiethanol), triethylene glycol (2,2'-(ethylenedioxy) diethanol), and hexamethylene glycol (1,6-hexanediol). Other polyhydroxy aliphatic alcohols such as glycerol (1,2,3-propanetriol) may likewise be selected. The particularly preferred polyhydroxy aliphatic alcohols are ethylene glycol, glycerol, and 1,3 butylene glycol. Mono- and dialkyl ethers of ethylene glycol marketed under the trademark Cellosolve may also be selected.

It is preferred that the organic liquid have a boiling point in excess of the temperature at which the annealing step is conducted so that this step may be conveniently carried out at atmospheric pressure. If necessary, however, the annealing step may be conducted under superatmospheric pressure conditions.

Contact between the semipermeable polybenzimidazole membrane and the organic liquid is preferably accomplished by immersing either the film or the fiber in the annealing bath. When contact is carried out through immersion, the organic liquid may be heated to the desired temperature prior to immersion, or the liquid may be raised to the desired temperature while in contact with the membrane. Such contact may alternatively be carried out by spraying or other similar techniques as will be apparent to those skilled in the art. It is recommended that the semipermeable membrane be annealed under conditions wherein it is free to shrink. Shrinkages of about 5 to 10 percent in length are commonly observed during the annealing step. It is preferred that the membrane is removed from its support prior to the annealing step.

It has been found that if one attempts to conduct the annealing step of the present process at a temperature below about 135° C. then the desired membrane improvement is not achieved. In a preferred embodiment of the invention the annealing step is conducted at a temperature of about 175° to 225° C. The particularly preferred annealing temperature when employing ethylene glycol as the water miscible organic liquid is 200° C. The particularly preferred annealing temperature when employing glycerol as the water miscible organic liquid is 225° C.

The period of time during which the annealing step is conducted varies with the temperature of the water miscible organic liquid. Generally satisfactory annealing is conducted in at least about 30 seconds. Annealing times commonly range from about 30 seconds to 20 minutes, and preferably about 8 to 12 minutes.

The theory whereby the properties of the semipermeable polybenzimidazole membranes are improved through the annealing treatment is considered complex and incapable of simple explanation. It is believed, however, that the microstructure of the membrane contracts to some degree to yield a more uniform configuration. Also, as indicated hereafter the annealing step results in improved performance during desalination separations.

In preparing the hollow filament fibers of the instant invention it is important to recognize that the optimum separators or reverse osmosis membranes are prepared from a plurality of parallel hollow fibers which fibers exhibit the minimum possible diameter, for as the diameter of the hollow fibers utilized decreases the surface area subject to the reverse osmosis processes necessarily is increased and there with it the rate of reverse osmosis. It is further desirable to have the maximum possible inside diameter in order to increase the inside surface area of reverse osmosis hollow filament membranes. Thus the optimum hollow filament fibers would be those of the smallest diameter having the thinnest possible walls. Bundles of the fibers or hollow filaments containing the desired number of fibers are prepared by applying an adhesive to each end of the group of prearranged parallel fibers. The bundled fibers are then preferably inserted into an elongated fluid-tight tubular casing assembly formed of a suitable material such as steel. Each end of the bundled fibers communicates to the outside of the casing while at either end of the casing a means for sealing each end of the fiber bundle to the ends of the casing is provided. The tubular casing is further provided with valves which open into the interior of the casing and to the outer surface of each of the fibers in the bundle, so as to provide a means for circulating the liquid to be purified about the hollow fibers. Although the fiber bundle should be packed as tightly as possible, it should be packed loosely enough to allow a liquid to pass between the individual fibers and effectively surround each hollow filament. Rather than utilizing a dual-ended tubular casing in which both ends are open to allow the escape of collected fluids, it is possible to utilize a permeator in which hollow filament bundles have been formed into a loop so that the ends of each of the filaments both exit through the same opening in the tubular casing. It is also of course possible to operate bundles of hollow fibers as reverse osmosis membranes when one end of the bundle has been blocked off.

In actual operation, water or the desired liquid is pumped into the casing to surround the exterior walls of the fibers in the bundle. (Pressure can range from slightly above ambient to about 5,000 psi, preferably 600 to 3,000 psi.) In the case of salt water substantially (as high as 99 percent or higher) salt free water (depending of course on the feed concentration) accumulates on the inside of the fibers and flows in either direction along the hollow filaments to the exit. Using the above procedure it is possible to prepare as much as 2 to 25 gallons of water or more per square foot of hollow fil membrane outside surface area per day at pressures up to 5,000 psi.

The hollow fibers as prepared above can be assembled for use in a water purification or permeator as described in U.S. Pat. No. 3,339,341, and as further described in U.S. Pat. No. 3,567,632.

Generally these permeators comprise in combination a fluid-tight casing assembled about a plurality of substantially parallel hollow fibers prepared from the polybenzimidazole polymers of the instant invention. The casing is provided with an inlet means for directing feed fluid (the fluid upon which the reverse osmosis operation is to act upon) over that portion of the exterior surface of the hollow fibers exposed in the interior of the casing. The casing is also provided with an exit means for selecting and removing a fluid which has been subject to the reverse osmosis process (in the case of salt water, desalinized water). Of course the feed fluid may also be directed into the interior of said hollow filaments in which case the fluid which has been subject to reverse osmosis is removed from the exterior surface of said hollow filaments.

When reverse osmosis membranes products or processes are referred to herein, it is of course understood that the liquid mixture or solution which is to be separated may be contacted with either one side or the other of the membranes or alternately with first one side and then the other side of the membrane. In either case on the other side of the membrane from the side of initial contact there is recovered liquid which contains a reduced amount of one component of the mixture or solution.

The resulting membrane formed of polybenzimidazole polymer consists of an outer relatively thin semipermeable surface layer formed during the evaporation step adjacent a relatively thick layer of a more porous structure. It is believed that the denser relatively thin outer layer is primarily responsible for the ability described hereafter of the resulting membranes to effect the separation of the components of a solution, and that the remaining more porous portion of the membrane serves primarily a supporting function. The membranes are characterized by high thermal stability and can withstand temperatures during use in excess of 125° C. Also, the membranes exhibit a high degree of chemical stability, and can continue to function in spite of contact with a wide variety of solvents.

The polybenzimidazole membranes of the present invention, once positioned upon a conventional porous support such as a porous steel plate, or arranged in hollow fil bundles, may be utilized to separate components of a solution by a variety of techniques, such as reverse osmosis, electrodialysis or ultrafiltration. For instance, the membranes of the present invention may be used to good advantage in those use areas where cellulose acetate separatory membranes have been used heretofore. However, because of the increased thermal and chemical stability exhibited by the polybenzimidazole membranes, a greater range of operating conditions, e.g., temperatures, may be employed. The theory whereby the membranes of the present invention function to selectively isolate components of a solution is considered complex and presently incapable of simple explanation. Representative separations which may be accomplished through the use of the polybenzimidazole membranes are as follows: sodium chloride from aqueous solutions of the same, inorganic or higher molecular weight organic salts and molecules from aqueous solutions of the same, inorganic or low molecular weight organic acids, etc.

The polybenzimidazole membranes of the present invention are particularly suited for use in desalination operations in which the presence of sodium and chloride ions is diminished in aqueous solutions of the same by reverse osmosis. Once positioned on a conventional porous support the membrane is in effect placed within a conventional reverse osmosis chamber with a solution of lesser salt concentration, e.g., pure water positioned on one side of the membrane and a solution of greater salt concentration on the opposite side. A pressure is exerted on the solution of greater salt concentration which exceeds the natural osmotic pressure and water of a lesser salt concentration is continuously withdrawn on the opposite low pressure side of the membrane. Additional salt water is continuously added to the high pressure side of the membrane and subjected to pressure. In this way, concentrated salt water may be withdrawn and disposed of, continuously or periodically, thereby minimizing the osmotic pressure which must be overcome to effect the separation.

The free energy of the solvent (i.e., water) in an aqueous sodium chloride solution is less than the free energy of the solvent in the pure state. There results, therefore, a spontaneous tendency for the solvent to move from the relatively high free-energy state of the pure solvent to the relatively low free-energy state of the solution. This tendency can be balanced by increasing the free-energy of the solution by subjecting it to an externally applied pressure. Mathematical derivations to determine the quantitative value of the pressure differential can be found in some physical chemistry texts.

The following examples are given as specific illustrations of the invention. It should be understood, however, that the invention is not limited to the specific details set forth in the examples.

EXAMPLE I

A polybenzimidazole polymer solution having a viscosity of 450 poises at 30° C. was prepared employing N,N-dimethyl acetamide as solvent containing 15 percent by weight poly-2,2'(m-phenylene)-5,5'-bibenzimidazole based upon the total weight of the solution, and 2 percent by weight lithium chloride based upon the total weight of the solution. The dissolution of the polymer was accomplished by agitating the same while in particulate form with the N,N-dimethyl acetamide solvent (in which the lithium chloride was previously dissolved) while in a closed zone at a temperature of about 230° C. The resulting solution was next filtered to remove any residual solids.

A quantity of the polymer solution while at ambient temperature (i.e. about 25° C.) was then poured onto a level smooth glass support having upright edges extending above the surface of the same to a height of approximately 0.008 inch (8 mils). A doctor blade resting on the upright edges of the glass support was then drawn over the surface of the deposited polymer solution at a rate of 0.75 inch per second to insure the formation of a wet film having a uniform thickness.

A stream of air at ambient temperature (i.e. about 25° C.) with a velocity of approximately 2 feet per second was passed over the exposed surface of the wet film causing a portion of the N,N-dimethyl acetamide solvent to evaporate. The exposure time of the film surface to the moving air was 1 minute. This evaporation step caused a relatively thin dense layer to form on the exposed surface of the film supported by a substantially less dense substructure of the polymer solution.

The resulting film while still present upon the smooth glass support was immersed for 10 minutes in a vessel of water having a temperature of about 25° C. While immersed in water, residual quantities of N,N-dimethyl acetamide were essentially completely removed from the film and the remaining polybenzimidazole polymer situated beneath the thin surface layer was coagulated to a solid porous consistency.

Next the resulting polybenzimidazole semipermeable membrane was removed from the glass support and was subjected to an annealing step by contact with a water-miscible organic liquid which is a non-solvent for the polymer. More specifically, the entire membrane along with the glass support was immersed for 10 minutes in a vessel containing ethylene glycol which was maintained at approximately 175° C. The annealed semipermeable membrane was stored by immersion in water provided at ambient temperature (i.e. about 25° C.) prior to being tested in a reverse osmosis separation as described in the procedure set forth following Example III.

EXAMPLE II

The semipermeable membrane formation technique described in Example I was substantially repeated with the exceptions indicated. The exposed surface of the wet film was subjected to a stream of air moving at a velocity of approximately 2 feet per second for a period of 3 minutes. A relatively thin dense layer formed upon the exposed surface of the film.

Following immersion in a vessel of water, the resulting semipermeable membrane was removed from the glass support and was immersed for 10 minutes in a vessel containing glycerol which was maintained at approximately 200° C.

The annealed semipermeable membrane was stored by immersion in water provided at ambient temperature (i.e. about 25° C.) prior to being tested in a reverse osmosis separation as described in the procedure set forth following Example III.

EXAMPLE III

Example II was repeated with the exception that the annealing step was conducted for 10 minutes by immersing the semipermeable membrane in a vessel containing glycerol which was maintained at 225° C. The annealed semipermeable membrane was stored by immersion in water provided at ambient temperature (i.e. about 25° C.) prior to being tested in a reverse osmosis separation.

The semipermeable polybenzimidazole membranes formed in Examples I, II, and III were tested with 0.5 percent by weight aqueous sodium chloride solutions while employing a conventional flat plate reverse osmosis apparatus. Each membrane was positioned upon a filter paper placed upon a sintered metal plate which is served to support the semipermeable membrane during desalination. Each membrane while mounted on its support was positioned in the reverse osmosis apparatus with the membrane surface of higher density facing the sodium chloride solution (i.e. solution of higher concentration), while the opposite surface faced the pure water (i.e. the solution of lesser concentration). An initial operating pressure of 600 lbs. per square inch was applied to the side of the apparatus containing the sodium chloride solution. The solutions were at 25° C. during the reverse osmosis separations. The results of the tests are set forth in the Table below.

The rejection value is a relative measure of the ability of the membrane to retard passage of the component being separated from the solution usually expressed as a weight percentage of the total.

Flux refers to the amount of solvent passing through the membrane per unit area per unit time and is generally expressed in gallons/ft.$^2$/day.

TABLE

| Example No. | Annealing Temperature | Annealing Medium | Flux | Per Cent Rejection |
|---|---|---|---|---|
| I | 175° C. | Ethylene Glycol | 14.0 | 92 |
| II | 200° C. | Glycerol | 23.0 | 86 |
| III | 225° C. | Glycerol | 20.0 | 87 |

As indicated in the Table, flux rates of 14.0 to 23.0 gallons per square foot per day and rejection rates of 86 to 92 percent were observed for the semipermeable polybenzimidazole membranes of Examples I, II, and III.

When comparing these flux and rejection values to those reported in commonly assigned Ser. No. 219,157 of Willard C. Brinegar, filed concurrently herewith which is herein incorporated by reference, it is apparent that improved semipermeable membranes are formed when the membrane formation process incorporates the annealing step as described herein. More specifically, the flux values are substantially increased while preserving relatively high rejection values.

The following Examples IV and V present a comparison or reverse osmosis flux and rejection values obtained when employing a conventional cellulose acetate semipermeable membrane and a semipermeable membrane and a semipermeable polybenzimidazole membrane formed in accordance with the present invention.

EXAMPLE IV

For purposes of comparison cellulose acetate (CA) semipermeable membranes were formed in accordance with the process disclosed by Loeb et al. in U.S. Pat. No. 3,133,132. The cellulose acetate membranes were annealed in water at 80° C. to duplicate as nearly as possible the Loeb et al. process. The polybenzimidazole (PBI) membrane used in the comparison was prepared in accordance with the process of the present invention substantially as set forth in Example I, and was annealed while immersed in ethylene glycol for approximately 10 minutes which was provided at 175° C. The test objectives were to determine and compare the functional variations of the two types of semipermeable membranes under analogous operating conditions at various operating temperatures. The membranes were tested in a conventional flat plate reverse osmosis apparatus as in the foregoing examples. The testing conditions employed an aqueous 0.5 percent sodium chloride feed solution at an operating pressure of 600 lbs. per square inch and a surface flow rate of 65 feet per minute. The solutions while in contact with the membranes were subjected in consecutive steps to temperature variations ranging from 25° to 90° C. The membrane rejection for each remained constant at about 95 percent as determined by standard conductivity measurements, while the rate of flux varied considerably over the test cycle. The results indicate that the polybenzimidazole membrane tends to substantially outperform the cellulose acetate membrane at temperatures above about 60° C. At 90° C. the cellulose acetate membrane ceased to function, while the polybenzimidazole membrane of the present invention continued to function well.

EXAMPLE V

This example presents a further comparison of reverse osmosis results achieved employing a cellulose acetate (CA) semipermeable membrane identical to those utilized in Example IV. The semipermeable membranes were tested in an identical reverse osmosis apparatus with an aqueous 0.5 percent by weight sodium chloride solution provided at a constant temperature of 50° C., an operating pressure of 600 lbs. per square inch, and a surface flow rate of 65 feet per minute.

Prior to testing the membranes were preconditioned for 72 hours under the same operating conditions with the exception that the solution was provided at 25° C.

The superiority of the polybenzimidazole membranes was apparent. While each membrane maintained a satisfactory rejection value, the flux values obtained with the cellulose acetate membrane were consistently lower. After 50 hours of operation at 50° C., the cellulose acetate membrane showed a tendency to drop-off in flux at a more rapid rate than the polybenzimidazole membrane.

EXAMPLE VI

The polybenzimidazole polymer solution described in Example I was placed in a spinning bomb and spun through a sheath-core (or concentric hollow jet) spinnet jet at ambient temperatures. The jet which was used had an outside diameter of about 0.036 inch and an inside diameter of about 0.029 inch. The polybenzimidazole polymer was spun through the outer ring of the jet nozzle while nitrogen was forced through the inner ring of the nozzle. As the polymer was spun through the outer ring, it was fed into a coagulation bath formed of water. During exposure to the bath which lasted about five seconds the hollow filament was drawn at a drawdown ratio of about 5 to 1. After exposure to the bath the hollow fil fiber was fed into an ethylene glycol annealing bath maintained at about 175° C. After about ten minutes exposure to the bath, the resulting hollow fil fiber exhibited a wall thickness of about 30 to 40 microns, an overall diameter of about 150 microns, and a tensile strength of about $1.25 \times 10^3$ psi.

The above fiber was then cut into 2 ft. lengths and about 100 of these filaments were glued together at each end and placed inside a sealed pipe. The glued ends were attached to each end of the pipe to form a liquid tight seal between the inside of the pipe and the outside of the pipe. The pipe itself was equipped with two valves located near each end of the pipe which valves communicated with the inside of the pipe and thus the outside surface of each of the fibers in the bundle. Using the above apparatus desalinized water was prepared by pumping salt containing water through the interior of the above apparatus under the desired pressure and collecting salt reduced water at either end of the pipe.

Six desalinization apparatus were constructed and operated at the following water pressures with the following results. Test pressure refers to the pressure at which water was introducted into the interior of the desalinization apparatus. Flux refers to the flow rate of desalinized water in gallons per sq. ft. of hollow fil fiber outside surface area per day. Rejection refers to the per cent of salt in the introduced salt water that was removed. In all instances 0.5 weight percent salt water solutions were used, with the following results:

| Example No. | Test Pressure (psi) | Flux (GFD) | Rejection Percentage |
|---|---|---|---|
| VII | 200 | 1.25 | 77.0 |
| VIII | 200 | 0.66 | 94.4 |
| IX | 400 | 1.6 | 95.2 |
| X | 500 | 1.7 | 98.7 |
| XI | 400 | 1.2 | 98.4 |
| XII | 600 | 1.4 | 99.1 |

EXAMPLE XIII

In order to demonstrate the unexpectedly superior results achieved when the hollow fil fibers of the instant invention are annealed as compared to hollow fil fibers which are not annealed, the following examples were carried out using, where indicated, ethylene glycol as the annealing medium:

| Example No. | Annealing Temperature | Test Pressure (psi) | Flux (GFD) | Rejection (Per cent) |
|---|---|---|---|---|
| XIV | | 200 | 0.84 | 25 |
| XIV-A | 175° C. | 200 | 0.66 | 94.5 |
| XV | | 200 | 2.9 | 18 |
| XV-A | 175° C. | 200 | 0.6 | 75 |
| XVI | | 600 | 8.5 | 16 |
| XVI-A | 175° C. | 600 | 2.0 | 85 |
| XVII | | 100 | 2.1 | 15 |
| XVII-A | 175° C. | 100 | 0.13 | 67.4 |

As can be seen from the above data annealed samples exhibit greatly increased salt rejection percentages as compared to those examples which are not annealed. Furthermore, although the flux rate decreases significantly when annealing procedures are utilized, the disadvantages of this decrease in flux are more than overcome by the highly significant increase in salt rejection percentage.

EXAMPLE XVIII

Using the same procedure as described in Examples VII through XIII above, a similar desalination unit were prepared utilizing DuPont's Permasep (aliphatic polyamide) fibers. Moisture regain for fibers prepared from a similar nylon was measured and found at 70° F. and 65 percent relative humidity to be about 4.5 percent, compared to about 13 percent for PBI polymer fibers of the compositions of Examples VII–XIII. Utilizing this apparatus at 600 psi resulted in the preparation of desalinized water at a rate of about 0.15 gfd with 53 percent of the initial salt concentration removed.

EXAMPLE XIX

Two desalination units, one similar to that utilized in Example XIII and a second similar to those annealed in Example XVIII were constructed. Both units were operated at input pressures of 600 psi for three months with the following results:

| Membrane Type | Time | Flow Rate (G/F/D) | Percent Salt Rejection (0.05 weight percent saline solution) |
|---|---|---|---|
| Example XIII | -0- | 2.5 | 98.0 |
| Example XIII | 3 mos. | 2.0 | 96.7 |
| Example XVIII | -0- | 2.0 | 96.0 |
| Example XVIII | 15 days | 1.24 | 70. |
| Example XVIII | 3 mos. | 1.2 | 70. |

Similar tests were carried out with the same type of membranes at 400 psi.

| Membrane Type | Time | Flow Rate (G/F/D) | Percent Salt Rejection (0.05 weight percent saline solution) |
|---|---|---|---|
| Example XIII | -0- | 1.3 | 98.0 |
| Example XIII | 15 days | 1.2 | 98.0 |
| Example XVIII | -0- | 1.3 | 90.0 |
| Example XVIII | 15 days | 1.0 | 70.0 |

Thus, whether 400 psi or 600 psi is chosen as the operating pressure it is readily seen that polybenzimidazole reverse osmosis hollow filament membranes exhibit far superior flow rates, rejection percentages and durability (strength) over similar membranes prepared from amide-linked polymers such as those disclosed in U.S. Pat. No. 3,567,632.

Although the invention has been described with preferred embodiments, it is understood that variations and modifications may be resorted to as will be apparent to those skilled in the art. Such variations and modifications are to be considered within the purview and scope of the claims appended hereto.

I claim:

1. A process for producing a semipermeable membrane comprising:
   a. providing a solution of a polybenzimidazole polymer in a solvent capable of dissolving said polymer,
   b. depositing a film of said solution upon a support,
   c. evaporating an amount of solvent from said film sufficient to allow the formation of a thin solid layer of about 0.01 to 20 microns on the exposed surface of said film having a density which is substantially greater than that of the remaining portion of said film on which said solid layer of increased density is formed,
   d. washing the resulting film with a non-solvent for said polymer to remove residual solvent thereby producing a semipermeable membrane, and
   e. annealing said resulting semipermeable membrane by contact with an organic liquid at a temperature of about 135° to 300° C. which is a nonsolvent for said polymer.

2. A process according to claim 1 wherein said polybenzimidazole polymer consists essentially of recurring units of the formula:

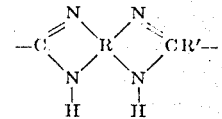

wherein R is a tetravalent aromatic nucleus, with the nitrogen atoms forming the benzimidazole rings paired upon adjacent carbon atoms of said aromatic nucleus, and R' is selected from the group consisting of (1) an aromatic ring, (2) an alkylene group having from four to eight carbon atoms, and (3) a heterocyclic ring selected from the group consisting of (a) pyridine, (b) pyrazine, (c) furan, (d) quinoline, (e) thiophene, and (f) pyran.

3. A process according to claim 1 wherein said polybenzimidazole polymer is poly-2,2'-(m-phenylene)-5,5'-bibenzimidazole.

4. A process according to claim 1 wherein said solvent capable of dissolving said polymer is selected from the group consisting of N,N-dimethyl acetamide, N,N-dimethyl formamide, dimethyl sulfoxide and N-methyl-2-pyrrolidone.

5. A process according to claim 1 wherein said solvent is N,N-dimethyl acetamide.

6. A process according to claim 4 wherein said polybenzimidazole polymer is present in said solvent in a concentration of about 5 to 30 percent by weight based upon the total weight of the solution.

7. A process according to claim 1 wherein said film is deposited on said support in a thickness of about 1 to 30 mils.

8. A process according to claim 1 wherein said resulting film is washed in water to remove residual solvent and thereby produce a semipermeable membrane.

9. A process according to claim 8 wherein said water is present at a temperature of about 5° to 30° C.

10. A process according to claim 1 wherein said annealing step is conducted from about 30 seconds to 20 minutes.

11. A process according to claim 1 wherein said organic liquid is a polyhydroxy aliphatic alcohol having two to three hydroxy groups and two to six carbon atoms.

12. A process according to claim 1 wherein said organic liquid is ethylene glycol.

13. A process according to claim 1 wherein said organic liquid is glycerol.

14. A process according to claim 1 wherein said organic liquid is 1,3 butylene glycol.

15. A process according to claim 1 wherein said organic liquid is at a temperature of about 175° to 225° C.

16. A process according to claim 1 wherein said annealing step is conducted under conditions wherein said semipermeable membrane is free to shrink.

17. A semipermeable membrane consisting essentially of polybenzimidazole polymer formed in accordance with the process of claim 1.

18. A process for producing a semipermeable membrane comprising:
  a. providing a solution of a polybenzimidazole polymer in a solvent selected from the group consisting of N,N-dimethyl acetamide, N,N-dimethyl formamide, dimethyl sulfoxide and N-methyl-2-pyrrolidone with said polymer being present in a concentration of about 5 to 30 percent by weight based upon the total weight of the solution, said solution also containing lithium chloride,
  b. depositing a film of said solution upon a support in a thickness of about 1 to 30 mils,
  c. evaporating an amount of said solvent from said film sufficient to allow the formation of a thin solid layer having a thickness of about 0.1 to 5 microns on the exposed surface of said film having a density which is substantially greater than that of the remaining portion of said film on which said solid layer of increased density is formed,
  d. washing the resulting film with water at a temperature of about 5° to 30° C. to remove residual solvent thereby producing a semipermeable membrane, and
  e. annealing said resulting semipermeable membrane by contact for about 30 seconds to 20 minutes with an organic liquid selected from the group consisting of ethylene glycol and glycerol at a temperature of about 175° to 225° C. under conditions wherein said membrane is free to shrink.

19. A process according to claim 18 wherein said solvent is N,N-dimethyl acetamide.

20. A process according to claim 18 wherein said polybenzimidazole polymer is poly-2,2'-(m-phenylene)-5,5'-bibenzimidazole.

21. In a process for producing a semipermeable reverse osmosis membrane from a polybenzimidazole starting polymer which has been formed into a reverse osmosis membrane from a polymer solution, the improvement which comprises annealing the resulting semipermeable reverse osmosis membrane by contact with an organic liquid at a temperature of about 135° to 300° C. which organic liquid is a non-solvent for said polymer.

22. The process of claim 21 wherein said polybenzimidazole polymer consists essentially of recurring units of the formula:

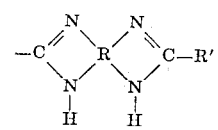

wherein R is a tetravalent aromatic nucleus with the nitrogen atoms forming the benzimidazole rings paired upon adjacent carbon atoms of said aromatic nucleus, and R' is selected from the group consisting of (1) an aromatic ring, (2) an alkylene group having from four to eight carbon atoms, and (3) a heterocyclic ring selected from the group consisting of (a) pyridine, (b) pyrazine, (c) furan, (d) quinoline, (e) thiophene, and (f) pyran.

23. The process of claim 21 wherein said polybenzimidazole polymer is poly-2,2'-(m-phenylene)-5,5'-bibenzimidazole.

24. The process of claim 21 wherein said semipermeable reverse osmosis membrane is in the form of a flat film.

25. The process of claim 21 wherein said membrane is in the form of a hollow filament.

26. The process of claim 21 wherein said membrane is in the form of a plurality of parallel hollow filaments.

27. The process of claim 21 wherein said membrane is prepared by:
  a. providing a solution of a polybenzimidazole polymer in a solvent capable of dissolving said polymer,
  b. depositing a film of said solution upon a support,
  c. evaporating an amount of solvent from said film sufficient to allow the formation of a thin solid layer on the exposed surface of said film having a density which is substantially greater than that of the remaining portion of said film on which said solid layer of increased density is formed,
  d. washing the resulting film with a non-solvent for said polymer to remove residual solvent thereby producing a semipermeable membrane, and
  e. conducting the annealing step from about 30 seconds to 20 minutes.

28. The process of claim 21 wherein said membrane is prepared in the form of a hollow filament which is prepared by a process comprising:
  a. extruding said filament through a concentric hollow jet spinnerette, and
  b. coagulating the thus formed hollow filament in a coagulation bath.

29. The process of claim 28 wherein said extruded fiber is exposed to a gaseous medium for a time sufficient to dry a layer on the outside of the extruded fiber and then is exposed to the coagulation bath.

30. The process of claim 29 wherein said annealing step is conducted from about 30 seconds to 20 minutes.

31. A reverse osmosis apparatus for separating fluid mixtures or solutions which comprises in combination a fluid-tight casing assembled about a plurality of substantially parallel hollow fibers prepared according to the process of claim 26 wherein said casing is provided with an inlet means for directing a feed fluid over that portion of the exterior surface of said hollow fibers exposed in the interior of said casing and further provided with an exit means for removing a fluid which has been subject to the reverse osmosis process from the interior of said hollow filaments and an exit means for removing fluid from within said fluid-type casing.

32. A reverse osmosis apparatus for separating fluid mixtures or solutions which comprises in combination a fluid-tight casing formed about a plurality of substantially parallel hollow fibers prepared according to the process of claim 26, wherein said casing is provided with an inlet means for directing a feed fluid into the interior of said hollow filaments and further provided an exit means for selecting and removing a fluid which had been subject to the reverse osmosis process from the exterior surface of said hollow filaments and an exit means for removing fluid from the interior surface of said hollow filaments.

* * * * *